Nov. 18, 1941.　　L. DE S. BARROS　　2,263,348
SAFETY BELT ATTACHMENT FOR VEHICLES
Filed Aug. 15, 1940　　3 Sheets-Sheet 1
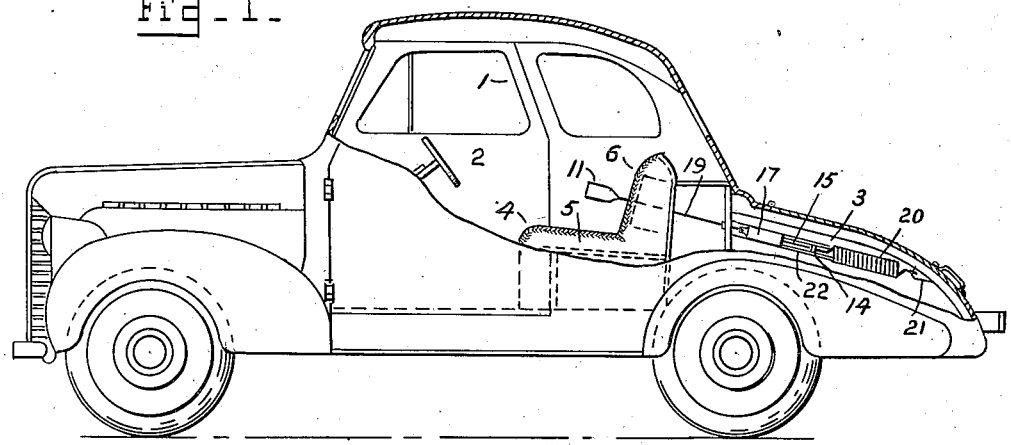
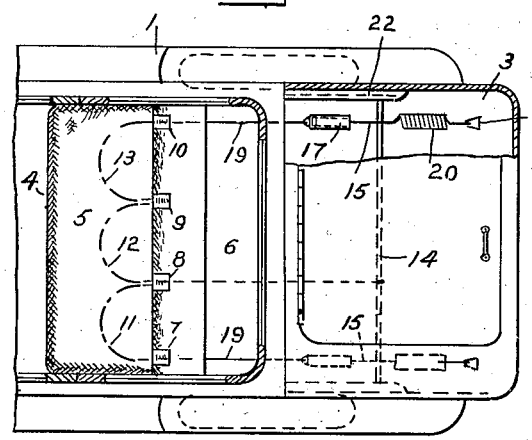 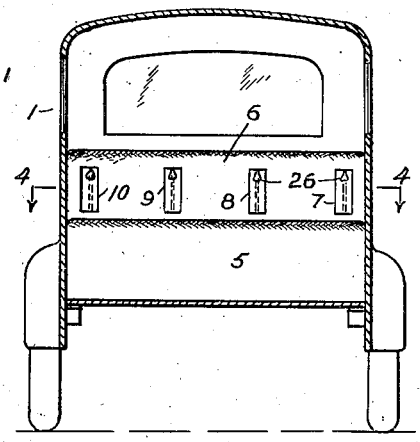
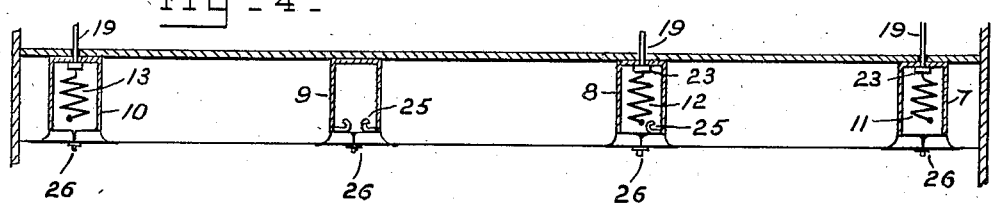
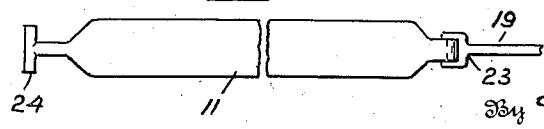
Inventor
Leonor de S. Barros Nov. 18, 1941.  L. DE S. BARROS  2,263,348
SAFETY BELT ATTACHMENT FOR VEHICLES
Filed Aug. 15, 1940  3 Sheets-Sheet 2
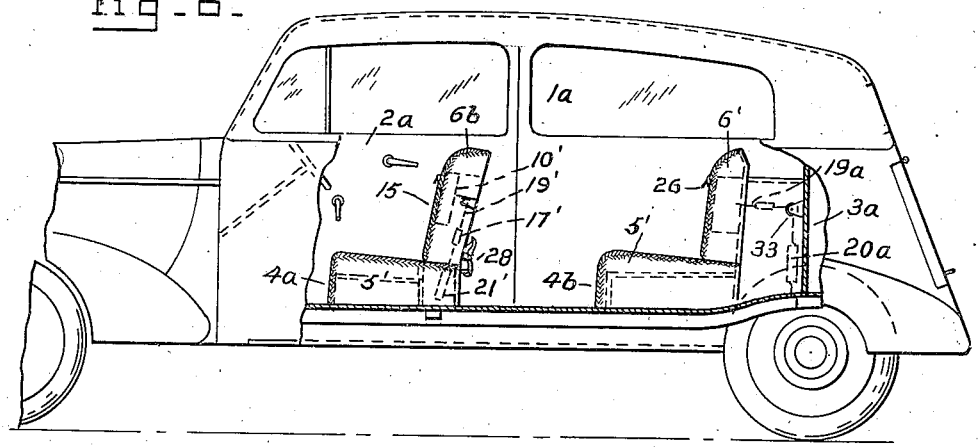
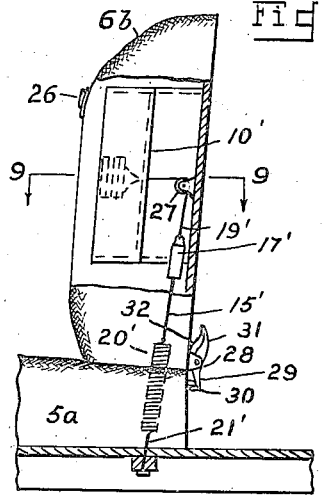
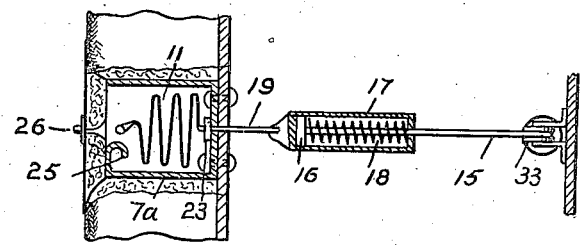
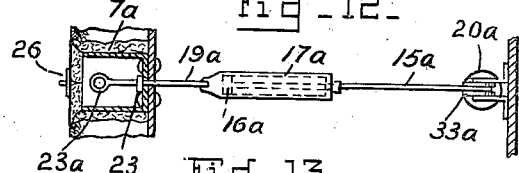
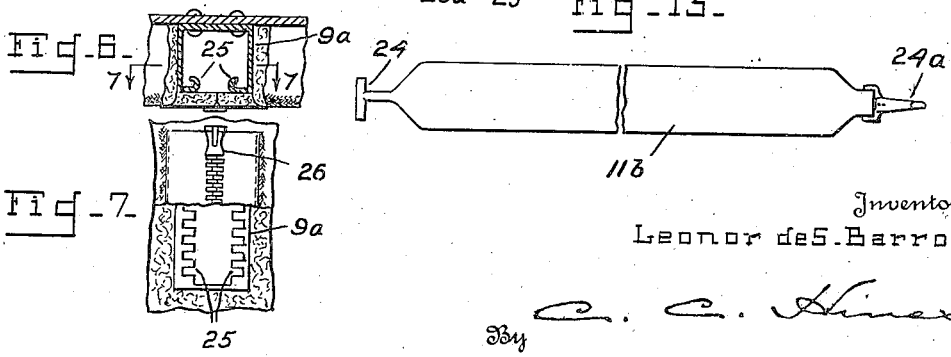
Inventor
Leonor de S. Barros
By
Attorney Nov. 18, 1941.  L. DE S. BARROS  2,263,348
SAFETY BELT ATTACHMENT FOR VEHICLES
Filed Aug. 15, 1940  3 Sheets-Sheet 3
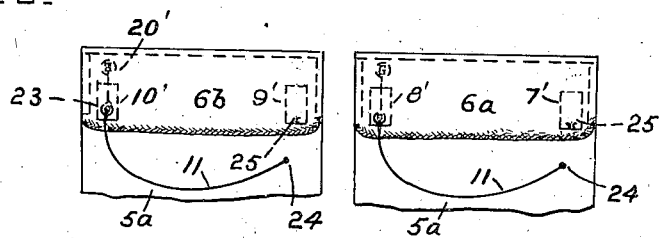
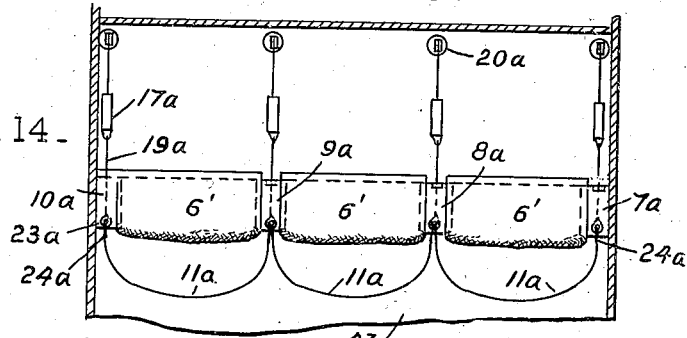
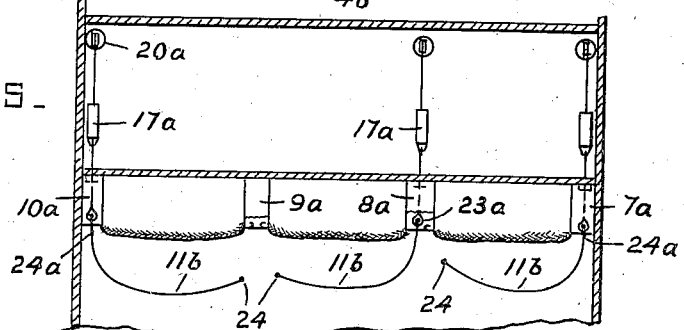
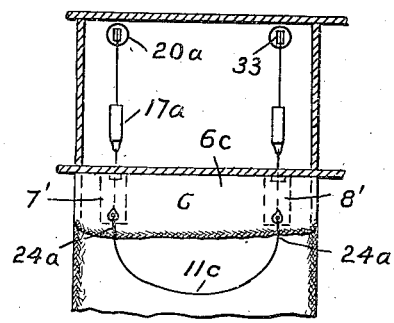
Inventor
Leonor de S. Barros
By
Attorney Patented Nov. 18, 1941

2,263,348

UNITED STATES PATENT OFFICE 2,263,348

SAFETY BELT ATTACHMENT FOR VEHICLES

Leonor de Souza Barros, Sao Paulo, Brazil

Application August 15, 1940, Serial No. 352,807

16 Claims. (Cl. 280—150)

This invention relates to safety belt appliances or attachments for automobiles, airplanes and other like vehicles, and particularly to safety belt attachments for holding the occupants of such vehicles securely in their seats against forces tending to throw them out of their seats, such as caused by sudden stops, irregular motions of the vehicle, or accidents.

The sudden stopping of automobiles traveling at high speeds, or even at medium speeds, often causes the occupants of the vehicle to be thrown out of their seats and against portions of the vehicle with sufficient force to cause personal injuries. The occupants are also liable to be thrown out of their seats in the travel of the vehicle over rough roads or as a result of a sudden swerving of the vehicle, or as a result of a collision of the vehicle with another vehicle or other objects. At any time when the driver of the vehicle is thrown out of his seat with force enough to shock, stun or injure him, he is liable to lose control of the vehicle with possible disastrous results. The occupants of an airplane are also liable to be thrown out of their seats and injured when the plane makes a bad landing or suddenly drops a vertical distance in flight on striking an "air hole" or "thin spot" or a sudden and irregular motion of the plane occurs.

One object of the invention is to provide novel strap attachments for use in connection with seats of automobiles, airplanes or other like vehicles whereby the occupants may be strapped to their seats and elastically held so as to prevent them from being thrown out of their seats as a result of a sudden stop, swerving or collision of the vehicle with another vehicle or other objects.

Another object of the invention is to provide safety belt attachments of this character which will yieldingly check and cushion the occupants against forces tending to throw them out of their seats, while permitting them to have free body movements.

Still another object of the invention is to provide a safety belt attachment having holding and cushioning means so constructed as to successively oppose elastic resistances of different degrees to the forward movement of the wearer and to the forcible displacement of the wearer from his seat so as to effectually cushion the shock and prevent injury to the wearer.

Still another object of the invention is to provide safety belt attachments of the character described which may be quickly and conveniently applied for use and quickly detached to release the wearer.

Still another object of the invention is to provide safety belt appliances of the character described, which are simple of construction, reliable and efficient in action, adapted to be readily applied to existing types of automobiles and other vehicles, and in which the belts or straps when not in use may be conveniently stored in an out-of-the-way position.

Still another object of the invention is to provide safety belts which are adjustable to suit children and adults of different heights.

With these and other objects in view, the invention consists of the features of construction, combination and arrangement of parts, hereinafter fully described and claimed, reference being had to the accompanying drawings, showing, for example the application of the invention to an automobile, and in which:

Fig. 1 is a sectional side elevation showing the application of the invention to an automobile of coupe or cabriolet type.

Fig. 2 is a sectional plan view thereof on line 2—2 of Fig. 3.

Fig. 3 is a vertical transverse section on line 3—3 of Fig. 2.

Fig. 4 is a horizontal transverse section through the seat back on an enlarged scale.

Fig. 5 is a view of one of the safety belts.

Fig. 6 is a horizontal section on an enlarged scale through the pocket having a pair of belt keepers.

Fig. 7 is a vertical section on line 7—7 of Fig. 6.

Fig. 8 is a view similar to Fig. 1 showing the application of the invention to a two-door automobile of coach type having front and rear seats and a rear trunk compartment, and in which a front seat back portion is movable to permit passage to and from the rear seat.

Fig. 9 is a sectional plan view through the front seat structure shown in Fig. 8, taken on line 9—9 of Fig. 10.

Fig. 10 is a vertical front-to-rear section through a portion of the automobile shown in Fig. 8 and showing particularly the movable seat back section.

Fig. 11 is a horizontal section through a portion of the rear seat shown in Fig. 8.

Fig. 12 is a view showing a modified form of restrainer connection.

Fig. 13 is a view of a modified form of belt.

Fig. 14 is a sectional plan view showing a safety belt arrangement in connection with divided seats.

Figs. 15 and 16 are similar views showing modifications in the safety belts and connections.

Referring now more particularly to Figs. 1 to 7, inclusive, of the drawings, in which I have shown the application of my invention to an automobile of coupe or cabriolet type, 1 designates the body of the vehicle having a passenger compartment 2 and a rear luggage or rumble seat compartment 3. The compartment 2 contains a seat 4 for the driver and one or more passengers with which safety belts embodying the invention are designed for cooperation.

The seat 4 may be of a conventional construction, comprising a cushioned seat body 5 and cushioned seat back 6, upholstered in the usual manner. The back 6, as shown, is provided, in accordance with my invention, with a plurality of pockets, four of such pockets designated 7, 8, 9 and 10, respectively, being shown in the present instance. These pockets, which open at their front through the front face of the seat back, may be formed of sheet metal boxes or castings enclosed within the seat back and suitably secured to the frame thereof.

The seat 4 as shown is designed to accommodate three persons, namely a driver and two passengers, seated side by side, and individual safety belts 11, 12 and 13 are provided for the use of the driver and each passenger. Each of these belts may be formed of leather, fabric or other suitable material of suitable strength and durability and each belt is shown in this form of the invention as being connected at one end with elastic restraining means and adapted to be fastened at its opposite or normally free end in working position for holding an occupant of the vehicle securely in his seat against forces tending to displace him from his seat.

The elastic restraining means comprises a horizontal transverse rod or bar 14 disposed in the compartment 3 and to which are fastened restraining connections leading therefrom into the pockets 7, 8 and 10. Each of these restraining connections comprises a rod or cable 15 which is secured at its rear end to the bar 14 and carries at its forward end a head 16 slidably mounted in a cylinder 17, a cushioning spring 18 being disposed in said cylinder between the rear end of the cylinder and the head. The opposite or forward end of the cylinder has attached thereto a cable, rod, rope or like connecting element 19 which extends therefrom through the wall of the seat back into one or the other of the pockets 7, 8 or 10 and is connected with one end of the particular safety belt 11, 12 or 13 which is designed to be stored when not in use in such pocket. The belts 11, 12 and 13 are designed when not in use to be stored in folded, rolled or other collapsed condition within the pockets 7, 8 and 10, and each of these belts is secured at one end to the connection 19 entering its receiving pocket. The cables 15, 19 and associated cylinder, piston and spring cushioning device of each restraining connection, which are shown in detail in Fig. 11, provide a primary elastic restraining means for each belt designed to oppose a predetermined elastic resistance to the forward movement of the belt under pressure exerted by the body of the person confined by the belt when such person is thrown forward in his seat by a displacing force. The construction of the restrainer is completed by the use of coiled springs 20 connecting the bar 14 with some suitable fixed part of the body, such as brackets 21 attached to the walls of the compartment 3. Any suitable number of these springs 20 may be employed to provide an elastic anchorage connection between the restrainer bar and the vehicle body and to serve as a secondary elastic restraining means opposing a resistance to the forward movement of each belt relative to the seat back under a displacing force exerted on the belt. In order to support the bar 14 and to adapt it to have free and easy backward and forward movements the ends of this bar may be arranged to engage channeled guides 22 fixed to the side walls of the compartment 3. The belts 11, 12 and 13 are designed, as stated, to be stored when not in use within the pockets 7, 8 and 10, in which position each belt will be compactly held by the backward pull of the elastic restrainer. To limit this backward movement of the restrainer, and its pull on the belts, a stop 23 may be provided at the point of attachment of each belt with its connector 19. The belts are provided at their free ends each with a T-shaped fastening member 24 to engage a keeper 25, a single keeper 25 being arranged within the pocket 8 for the fastening engagement therewith of the fastening member 24 on the belt 11 and a pair of keepers 25 being disposed in the pocket 9 for the respective engagement therewith of the fastening members 24 on the free ends of the belts 12 and 13, the pocket 9 serving in this form of the invention solely as a pocket for holding the keepers with which the said belts 12 and 13 are engaged. Suitable closures 26 are provided for the forward ends of the pockets when the belts are not in use. These closures may consist of padded flaps or sections of fabric or other material secured to the upholstered material of the back 6 and adapted to be opened and closed and secured at their meeting edges in closed position by zipper type or other suitable fastenings, so that when the belts are not in use the belts and their pockets will be concealed from view. If desired, the material of which the closures 26 is made may conform in character and shade to that of the upholstery fabric of the seat back. Each keeper 25 may consist of a vertically disposed comb-shaped bar or plate provided with a series of spaced locking tongues or hooks with which the T-shaped fastening member on the belt is adapted to be engaged and held against casual displacement, the arrangement being such that the belt may be adjusted as to height to suit children and adults of different sizes or varying in heights.

In the use of the safety belts, it will be understood that the closures of the belt pockets are opened and each belt drawn out, passed across the body of the person to be held in the region of the waistline and engaged at its free end with the tongues or hooks of the proper keeper member 25. The drawing out of the belt and its applications for use moves each keeper forward to some degree against the resistance of the cushioning spring 18 of the primary elastic restraining device, so that the belt will be held snugly in contact with the person. As, however, the primary elastic restraining device forms an elastic take up and let out connection between the belt and the bar 14, the belt is permitted to yield forwardly under body movements of the user, so that the user is not strictly confined, but may move about in his seat practically as easily and comfortably as a person unconfined. The belted person, in other words, may move his body to certain degrees forwardly and backwardly with relation to the seat back and also sidewise, without being unduly hampered or restricted in such movements by the belt. Should the vehicle while running at high or intermediate speeds be suddenly stopped or caused to swerve, so as to produce a force tending to throw the person forward and out of his seat, this movement will be elastically checked first by the primary elastic restrainer and finally, in the case of a considerable force being exerted, by the secondary elastic restrainer, so as to hold the person from being thrown off his seat while at the same time cushioning his movement so as to prevent shock or undue violence of movement. The belts will thus prevent persons in the car from being thrown against each other or against portions of the car with violence sufficient to cause serious injury even in the case of a sudden and great force being exerted as a result of the collision of the car with another car or other objects. In the case of the car turning over or somersaulting, the belts will hold the persons from being thrown about the car and reduce liability of serious injuries being sustained by them. The construction is such that where an accident occurs and the vehicle comes to a stop and further danger exists, the person held by a belt may readily release himself or be released by another by disengaging the belt so that he may leave or be removed from the car.

In Figs. 8 to 11 and 14 I have shown the application of the invention to a two-door sedan, coach or like type of vehicle having a passenger compartment 2a and a trunk compartment 3a, in which passenger compartment are front and rear seats 4a and 4b. The rear seat 4b is or may be of the same general construction as the seat 4 illustrated in Figs. 1, 2 and 3, comprising cushioned seat bottom and back portions 5' and 6' of continuous or divided type, but the front seat is of a construction commonly used in this type of automobile, that is, one comprising a cushioned seat bottom 5a and a divided back formed of sections 6a and 6b, the section 6a being fixed while the section 6b is pivotally mounted at its base to tilt forwardly and rearwardly between inoperative and operative positions. When the seat back 6b is tilted forward a passageway is provided between the door at one side of the vehicle and the rear portion of the compartment 2a to give access to such portion of the compartment containing the rear seat. A slightly modified construction and different arrangement of the restrainers is necessary in the application of the invention to this type of vehicle. As shown particularly in Fig. 9, the seat back sections 6a, 6b are respectively provided with pairs of pockets 7', 8', 9', 10', the compartments 8', 10' of each pair serving as housing compartments for the belts 11 and the compartments 7', 9' serving as keeper compartments in which keepers 25 of the type previously described are arranged and with which the fastening members 24 on the belts are adapted to be engaged. Enclosed within each back 6a, 6b and the seat bottom 5a are restrainers of the general construction previously described, each comprising a cable 21' fastened at its lower end to a part of the vehicle frame or chassis and thence passing upwardly into the seat base 5a and lower portion of the seat back and being connected at its upper end to the lower end of a coiled spring 20'. The upper end of this spring is attached to the lower end of a cable or rod 15' having a head 16' at its upper end movable in a cylinder 17' attached at its upper end to a cable 19' which extends into the housing 8' or 10' as the case may be and is attached to the associated belt 11. This cable 19' passes over a direction pulley 27 whereby it is properly guided. The elements of this restrainer correspond substantially in construction to that shown in Figs. 1 to 7, inclusive, and function in the same manner, but in this case the restrainer is enclosed in the seat base and seat back to conceal it from view and adapt it for use with this type of seat. The restrainer applied to the movable seat back 6b functions also to hold this seat back in normal or operative position, while permitting it to be tilted without interference forward to an inoperative position. Ordinarily such a tilting seat back is not fastened in its operative position, reliance being placed upon the friction of its pivots and rearward inclination of the seat back to hold it from forward movement. I, however, provide means for positively holding the seat back 6b from forward movement until it is desired to tilt it forward. Such means may consist of a latch 28 pivoted to the seat back and having a hooked lower end 29 to engage a keeper 30 on the seat bottom. The upper end of this latch forms a finger piece 31 by which it may be pressed to release it from the keeper. A spring 32 acts on the latch to hold it engaged with the keeper in the operative position of the seat back and to adapt the latch to automatically snap into engagement with the keeper when the seat back is swung from its forwardly tilted inoperative position back to its operative position. By latching the seat back 6b, or holding it fixed in operative position, it is adapted to operate in conjunction with the elastically restrained belt in the same manner as a normally fixed seat back. Obviously the pull of the restrainer springs in the movement of the seat back from an inoperative to an operative position aids in returning the seat back to normal position and cooperates with the latch to automatically lock and hold the seat back locked in such position.

The construction of the rear seat 4b and construction and arrangement of the safety belt connections used in conjunction therewith is or may be that shown in Figs. 8, 11 and 14, or any other suitable construction of seat and construction and arrangement of safety belt connections may be employed. For example, the seat 4b, designed to seat two or three persons, may be a conventional type of seat having a continuous or unitary seat bottom and a continuous or unitary seat back, or it may be constructed, as shown in Fig. 14, as a divided seat, comprising a plurality of individual seat bottoms and a plurality of cooperating individual seat backs. Fig. 14 shows a divided seat construction, in which pockets 7a, 8a, 9a and 10a are arranged between the intermediate and side seat back sections and between the latter and the sides of the car. These pockets may correspond in construction to the pockets previously described. The belts 11a here shown, however, are arranged for use with elastic restrainers in a somewhat different manner from any of the forms of the invention previously described, each belt being coupled to an elastic restrainer within each pocket and being provided for that purpose at each end with a spring snap hook or like fastener 24a. These snap hooks engage eyes 23a or the like at the forward ends of the connector cables or rods 19a, one of which extends from the rear of the seat back into each pocket. The connector rod or cable 19a is attached to the forward end of a cylinder 17a slidably receiving a cable 15a having a head 16a between which and the rear end of the cylinder is arranged a coiled spring 18a, the construction of this portion of the restrainer being the same as that set forth with relation to the previously described forms of the invention. The cable 15a, however, extends rearwardly and downwardly over a direction pulley 33 mounted upon a wall of the compartment 3a and is attached to the upper end of a secondary restrainer spring 20a which is suitably fastened at its lower end to a part of the frame or chassis of the vehicle. With this arrangement it will be seen that the outer ends of the side belts 11a are attached by their snap hooks to the connectors or restrainers entering the pockets 7a, 10a, while the inner ends of said side belts and ends of the intermediate belt are adapted to be attached by their snap hooks to the connectors of restrainers entering the pockets 8a and 9a. By this construction each belt is connected to, and its forward movement is opposed by, the elastic resistance of two restrainers, and the arrangement is such that either end of each belt may be disconnected from the restrainer to which it is attached, as may be found most convenient for the user. Obviously, also, with this construction any of the pockets may be employed as storage pockets for the belt. For example, one of the side belts may be stored when not in use in pocket 7a, the other side belt stored when not in use in pocket 10a, and the intermediate belt stored in either of the pockets 8a or 9a.

Fig. 12 shows more particularly the construction of restrainer which may be employed in the described manner in connection with the belts shown in Fig. 14.

Fig. 13 shows a modified form of belt which may be used wherein the belt 11b is provided at one end with a snap hook or like fastener 24a and at its other end with a T-shaped fastening member 24. One use of this form of belt is shown in Fig. 15 disclosing a divided seat back arrangement similar to that shown in Fig. 14, although it is to be understood that the arrangement shown in Fig. 15 may be employed also in connection with a continuous seat back. As illustrated, connectors of restrainers of the form shown in Fig. 12 extend into the pockets 7a, 8a and 10a. In the pocket 8a is arranged a keeper 25 and in the pocket 9a are arranged two such keepers 25. One of the side belts is connected at one end by its snap hook 24a with the eye of the connector entering pocket 7a and its other end carrying the T-shaped fastener 24 is adapted to be engaged with keeper 25 in pocket 8a. The other side belt is similarly fastened at one end by its snap hook to the eye of the connector entering pocket 11a and its other end carrying a T-shaped fastener 24 is adapted to be engaged with one of the keepers 25 in pocket 9a. The intermediate belt is fastened at one end by its snap hook to the eye of the connector entering pocket 8a and its other end carrying the T-shaped fastener 24 is adapted to be engaged with the other keeper 25 in pocket 9a.

Fig. 16 shows still another arrangement which may be used with any type of seat having a fixed seat back where space is available for the accommodation of the restraining means. Here the seat back 6c is provided with pockets 7', 8' into which enter connectors of restrainers of the type shown in Fig. 12 and with the eyes 23a of which are engaged the ends of a belt 11c, which ends of the belt are provided with snap hook or like fasteners 24a. With this arrangement both ends of the belt may be attached to similar restrainers opposing equal resistances to the forward displacement of the belt. When the belt is not in use it may be disconnected from the connector in one pocket and stored in the other pocket.

From the foregoing description, taken in connection with the drawings, the construction and mode of operation of my safety belt attachment for automobiles and other vehicles will be readily understood, and it will be seen that the invention provides a safety belt construction which may be used to great advantage in such vehicles to prevent the occupants of the vehicle from being thrown out of their seats and injured when, due to a sudden stop, collision or other cause, a force causing the occupants to be impelled from their seats is produced. The safety belts will also serve in many cases to prevent loss of life or injuries caused by the occupants being ordinarily thrown with great force about the car when the car overturns or somersaults as the result of an accident. It will be readily apparent that the construction of the belts and restrainers is such that they may be readily installed on new or old cars and cars of all types in general use at a comparatively low cost. For purposes of exemplification I have disclosed herein several forms of the invention which may be practically used, but it is to be understood that these are merely exemplificative and that the constructions shown or any equivalent constructions, falling within the scope of the appended claims, and as suits the taste or fancy of the manufacturer, may be employed without departing from the spirit or sacrificing any of the advantages of the invention.

What I claim is:

1. In combination with a vehicle having a seat provided with pockets, a belt adapted to be normally housed in one of the pockets and withdrawn and extended therefrom across to the other pocket for holding a person from displacement from the seat under a displacing force, a fastener having a plurality of fastening members disposed in one of said pockets for detachably and adjustably fastening one end of the belt therein, and yielding restraining means passing through the other pocket and connecting the belt with a fixed part of the vehicle so as to impose an elastic resistance to movement of the belt under pressure of the body of the person resulting from a displacing force.

2. In combination with a vehicle having a seat provided with pockets, a belt adapted to be normally housed in one of the pockets and withdrawn and extended therefrom across to the other pocket for holding a person in the seat against a displacing force, an elastic restraining connection extending into one of the pockets and connecting one end of the belt with a part of the vehicle, said restraining connection including a plurality of elastic restrainers to impose a predetermined initial resistance to the force and thereafter a greater resistance to the force, and means in the other pocket engageable by the other end of the belt to hold the belt in operative position.

3. In combination with a vehicle having a seat, a pair of spaced pockets in the seat, a belt adapted to be normally housed in one of the pockets and withdrawn therefrom and extended across to the other pocket for holding a person in the seat against a displacing force, means upon the belt and within one of the pockets for connecting one end of the belt to the seat, and means passing through the other pocket and connecting the opposite end of the belt with a fixed part of the vehicle and including a restrainer for imposing an elastic resistance to movement of the belt.

4. In a vehicle having a seat and a pivoted seat back movable between operative and inoperative positions, a safety belt for holding a person in said seat, and elastic restraining means for holding the belt in working position and from forward movement relative to the seat back, said restraining means passing through the seat and seat back and being connected with a fixed part of the vehicle and operative to move the seat back from an inoperative to an operative position.

5. In a vehicle having a seat and a pivoted seat back movable between operative and inoperative positions, a pair of spaced pockets in the seat back, a keeper in one of the pockets, a belt having fastening means at one end thereof for engagement with said keeper, a connecting element attached to the other end of the belt and passing through the other pocket, restraining means connecting said connecting element with a fixed part of the vehicle and operating to impose a yielding resistance to movement of the belt away from the seat back and to move the seat from an inoperative to an operative position, and automatic locking means to lock the seat back when moved to operative position.

6. In a safety belt attachment for vehicles, and in combination with a vehicle seat, a belt for holding a person in his seat, connecting means for detachably and adjustably connecting one end of the belt at different elevations with the seat, and a connecting means between the other end of the belt and a fixed part of the vehicle, said connecting means extending movably through the seat and including primary and secondary elastic resistance devices successively acting for cushioning and limiting the outward movement of the belt relative to the seat.

7. In combination, a vehicle having a seat, a plurality of pockets in the seat, a safety belt adapted to be housed in a pocket and to be withdrawn therefrom for use, an elastic restricting connection extending into said pocket and connecting one end of the belt with a part of the vehicle, and means in another pocket engageable by and with the other end of the belt to hold the belt in operative position.

8. In combination, a vehicle having a seat, a plurality of pockets in the seat, a safety belt adapted to be housed in a pocket and to be withdrawn therefrom for use, an elastic restricting connection extending into said pocket and connecting one end of the belt with a part of the vehicle, means in another pocket engageable by and with the other end of the belt to hold the belt in operative position.

9. In a vehicle having a seat provided with a pivoted seat back movable between operative and inoperative positions, a safety belt, and means carried by and opening through the front of the seat back for holding the belt in working position, said means including elastic restraining means connecting the belt with a fixed part of the vehicle and opposing movement of the belt away from the seat back and operative to move the seat from an inoperative to an operative position.

10. In a vehicle having a seat provided with a pivoted seat back movable between operative and inoperative positions, a safety belt, means carried by and opening through the front of the seat back for holding the belt in working position, said means including elastic restraining means connecting the belt with a fixed part of the vehicle and opposing movement of the belt away from the seat back and operative to move the seat from an inoperative to an operative position, and a latch to automatically lock the seat back in its operative position when moved thereto from its inoperative position.

11. A vehicle having a seat provided with a pair of spaced pockets having entrance ways opening outwardly through one of the seat surfaces, an elastic restrainer anchored to a fixed part of the vehicle other than the seat and extending into one of said pockets, a belt adapted to be housed in said pocket and having one of its ends connected to the restrainer in said pocket, said belt adapted to be withdrawn from said pocket through its entranceway and extended over said seat surface to the other pocket and to have its free end inserted into said other pocket through its entranceway, and means in the latter-named pocket for engaging and holding the free end of the belt.

12. In a vehicle, a seat provided with spaced pockets, a safety belt adapted to be housed in one of said pockets and withdrawn therefrom and extended across a surface of the seat back to another pocket, an elastic restrainer connected to and extending from a fixed part of the vehicle into the first-named pocket and connected to one end of the belt, said restrainer having spring means therein for imposing a resistance to the movement of the belt away from the seat back, and means in the second-named pocket for detachable engagement of the other end of the belt therewith.

13. In a vehicle, a seat provided with spaced pockets, a safety belt adapted to be housed in one of said pockets and withdrawn therefrom and extended across a surface of the seat to another pocket, an elastic restrainer connected to and extending from a fixed part of the vehicle into the first-named pocket and connected to one end of the belt, said restrainer having spring means therein for imposing a resistance to the movement of the belt away from the seat, and a second elastic restrainer connected to and extending from a fixed part of the vehicle to the second-named pocket and having means for the attachment of the opposite end of the belt thereto.

14. In a vehicle, a seat including a seat back, a plurality of spaced pockets in the seat back, safety straps adapted to be housed in certain pockets and each adapted to be extended across the front of the back to another pocket, fastening members in certain pockets, a bar extending transversely of the vehicle in rear of the seat back, resilient means connecting said bar with a part of the vehicle, connections extending from the bar into the pockets in which the straps are housed, each connection being coupled to an end of the strap in its housing pocket and including resilient means therein opposing movement of the strap away from the seat back, and means at the other ends of the straps for engaging the same with said fastening means.

15. In a vehicle, a seat having transversely spaced pockets, a safety strap adapted to be housed in one of the pockets and extended therefrom over a surface of the seat to the other pocket, means for detachably securing one end of the strap within the second-named pocket, and an elastic restrainer connected to a fixed part of the vehicle other than the seat and extending into the first-named pocket and connected to the other end of the strap, said restrainer including relatively movable portions and a spring interposed between said portions and opposing movement of the same away from each other.

16. In a vehicle, a seat including a seat back having a pair of spaced pockets therein, a belt for holding a person in said seat, said belt adapted to be housed in one of the pockets and withdrawn therefrom and extended over a surface of the seat to the other pocket, means for detachably securing one end of the belt in the second-named pocket, and movable restraining means connected to a fixed part of the vehicle and extending into the first-named pocket and connected to the other end of the belt, said restrainer including a plurality of elastic resistance devices successively acting to cushion and limit the outward movement of the belt relative to the seat.

LEONOR DE SOUZA BARROS.